United States Patent [19]

Suhanek

[11] Patent Number: 4,916,289

[45] Date of Patent: Apr. 10, 1990

[54] PLASTIC WELDER

[76] Inventor: Kenneth J. Suhanek, 9025 N. Karlov Ave., Skokie, Ill. 60076

[21] Appl. No.: 172,077

[22] Filed: Mar. 23, 1988

Related U.S. Application Data

[63] Continuation-in-part of Ser. No. 29,454, Mar. 13, 1987, abandoned.

[51] Int. Cl.$^4$ .............................................. H05B 1/00
[52] U.S. Cl. ................................. 219/230; 219/229; 219/227; 228/51; 228/52; 226/127; 156/579
[58] Field of Search .............. 219/227, 229, 230, 240, 219/241, 230; 156/577, 579, 500; 222/146.1, 146.5; 126/343.5 R, 343.5 A; 226/127–129; 228/51–55

[56] References Cited

U.S. PATENT DOCUMENTS

| 2,432,428 | 12/1947 | Lang | 219/241 |
|---|---|---|---|
| 2,447,649 | 8/1948 | Harrison | 219/229 |
| 2,742,142 | 4/1956 | Paulsen | 203/110 |
| 2,758,192 | 8/1956 | Gustafsson | 219/229 |
| 2,765,390 | 10/1956 | Chapel et al. | 219/229 |
| 2,875,719 | 3/1959 | Smith | 219/229 |
| 2,995,159 | 8/1961 | Berggren | 141/82 |
| 3,279,971 | 10/1966 | Gardener | 156/500 |
| 3,707,258 | 12/1932 | Schlitt | 228/41 |
| 3,852,565 | 12/1975 | Kager | 219/241 |
| 4,289,257 | 9/1981 | Herb et al. | 222/146 HF |

Primary Examiner—M. H. Paschall
Attorney, Agent, or Firm—Clement and Ryan

[57] ABSTRACT

A plastic welder that can be held and operated with only one hand. The supply rod or filler rod can be advanced into and through the heating tip of the welder by a trigger that can be actuated by the user with the same hand in which the grip of the plastic welder is held. No air assist is required, as a device is provided for reliably avoiding overheating of the plastic welder by intermittently interrupting the electrical current feeding the heating element at times automatically determined by a temperature setting selected by the user. The heating tip is formed of a major portion of steel infiltrated with a minor portion of copper. The temperature of the heating element with the welder in inoperative condition is maintained at a predetermined level above the temperature of the heating tip when the welder is operative and in use. The heating tip has an elongated end surface of substantially uniform width throughout, to contact the objects being welded and to define a discharge aperture through which melted thermoplastic material from the supply rod exits out of a supply rod heating chamber that is located within the heating tip.

16 Claims, 2 Drawing Sheets

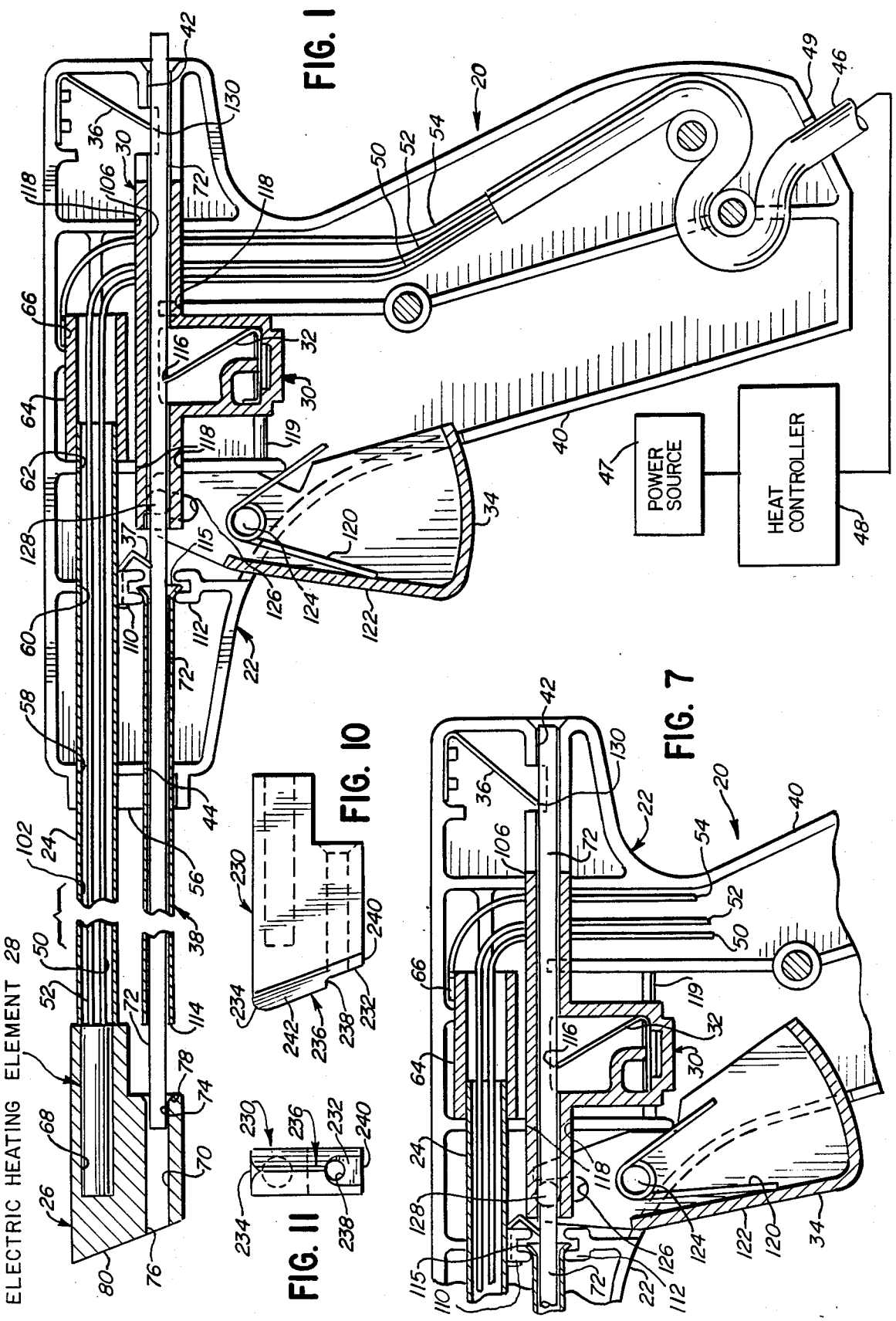

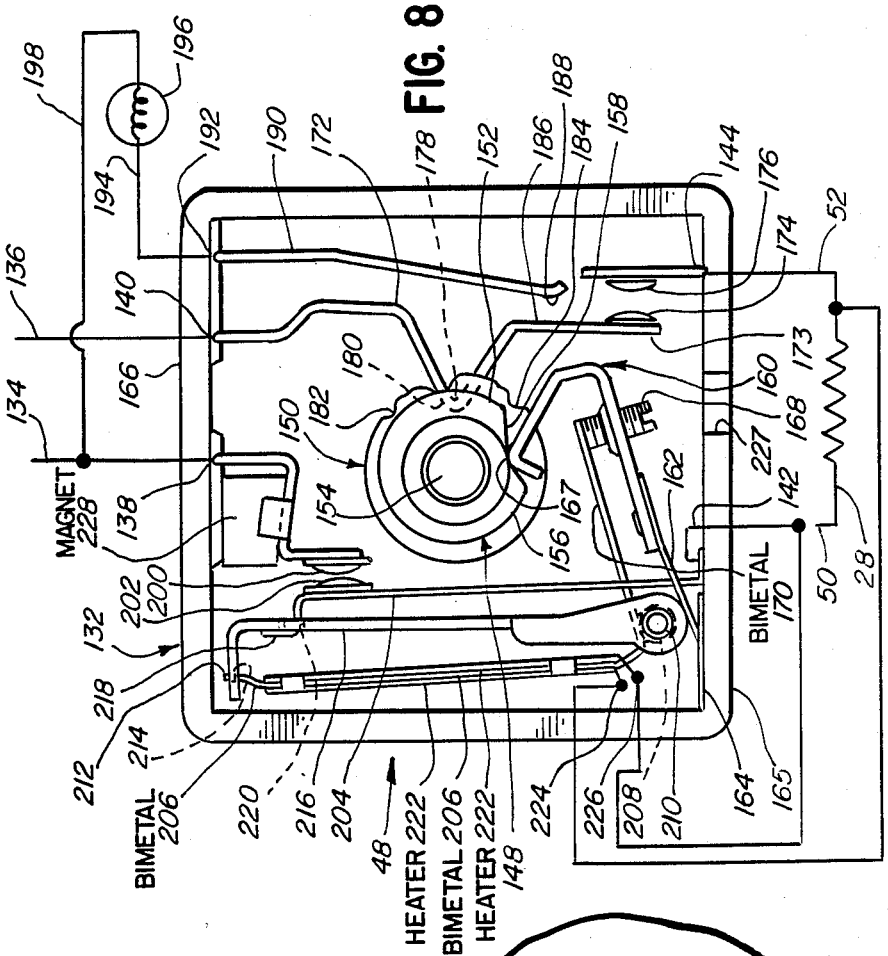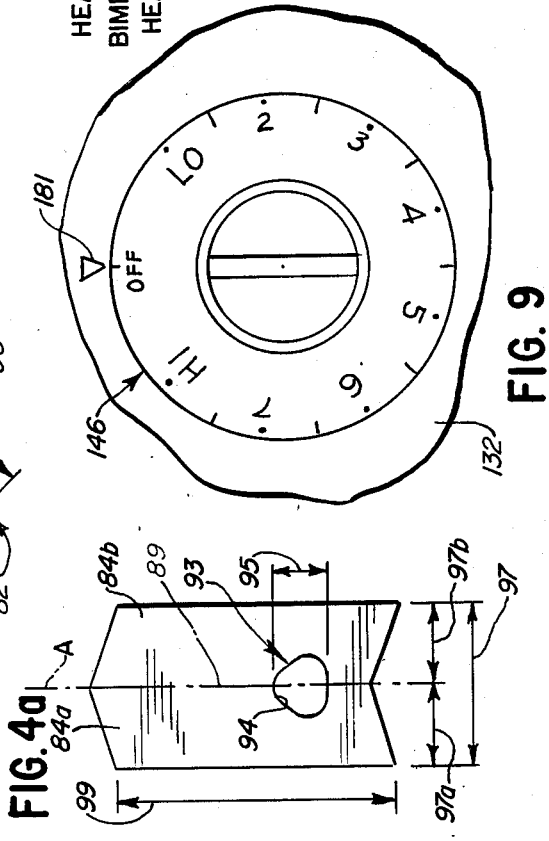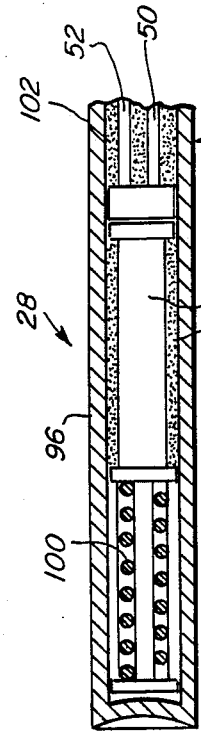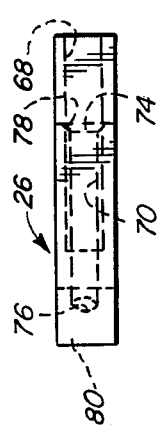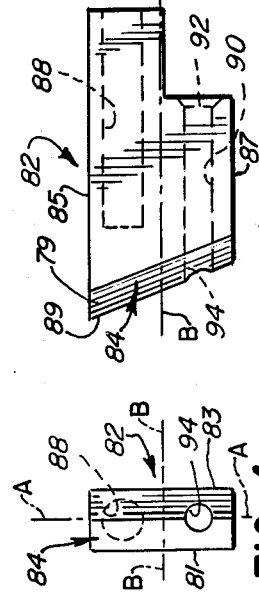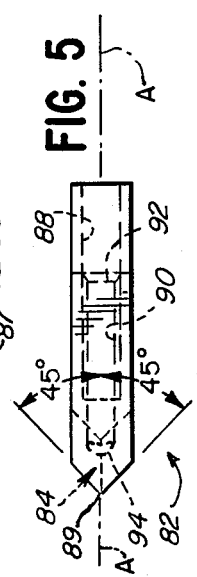

PLASTIC WELDER

This application is a continuation-in-part of the co-pending application filed by the same inventor on Mar. 13, 1987 and assigned Ser. No. 07/029,454 now abandoned.

This invention relates to a plastic welder, and in particular to such a device that can be held and operated with only one hand.

BACKGROUND OF THE INVENTION

As is well known, the shortages of various materials in World War II, together with the natural development of the plastics industry over time, have led to the introduction in the several decades just past of a large number of new plastics, both thermosetting and thermoplastic in nature. Plastics have been used for a wide variety of purposes—for example, in the manufacture of automobile parts and bodies, toys, television cabinets, housewares, furniture, and many other products.

At the same time, as the use of thermoplastic materials has become more and more widespread, plastic welder devices have been developed to repair cracks, holes, tears and other defects that inevitably occur in these materials with use. Such devices have been available for many years, but all of them have suffered from one or more significant shortcomings.

Since thermoplastics break down chemically if they are exposed to temperatures substantially above their particular melting ranges, most plastic welders presently available require an air assist to keep the heating element of the welder from raising the temperature of the material being repaired to too high a level. Inclusion of air assist makes the plastic welder more complicated and bulky in construction, as well as more expensive to manufacture.

Means for reliably avoiding overheating of the plastic welder by intermittently interrupting the electrical current feeding the heating element in response to a temperature setting selected by the user (according to the type of thermoplastic materials being welded) have long been available, but for some reason no worker in this field prior to applicant appears to have believed that such expedients could be used to advantage in a tool of this type. This is true in spite of the increased economy of manufacture and efficiency of operation that are available through utilization of this approach.

Another substantial defect in prior art plastic welders is the difficulty of handling the tool during use. So far as applicant is aware, all plastic welders presently available require that the welder be held in one of the user's hands, while the supply rod of thermoplastic material for the weld to be made is fed into the welder with the other hand. Two-handed operation of the plastic welder as thus described is obviously awkward and inconvenient.

Still another shortcoming in prior art plastic welders is the susceptibility of their heating tips to damage from long continued use. In plastic welders known to applicant prior to his invention, the heating tips used to melt the objects to be welded and to melt the supply rod or filler rod are made of solid copper or of stainless steel. Such copper tips have not proved to be as durable as desirable, and both types have been quite expensive to fabricate.

The plastic welder of this invention avoids all these disadvantages of the prior art devices.

SUMMARY OF THE INVENTION

The plastic welder of this invention includes (a) a casing, (b) a supporting handle grippable by the user of the welder, (c) a heating tip supported outside the casing, with (d) a heating element encased therein, the heating tip also defining a heating chamber to receive a supply rod of thermoplastic material, (e) means to support the supply rod within the casing, (f) means to advance the supply rod out of the casing into the heating chamber within the heating tip, (g) manually actuatable operating means to selectively operate the advancing means, which operating means is actuatable by the same hand with which the user grips the casing handle, (h) a heat controller to maintain the temperature of the heating tip in the desired predetermined melting ranges of the thermoplastic material or materials being welded, and (i) manually operable selector means for the user to set the temperature level at the appropriate level for the particular thermoplastic being welded.

A trigger means is provided by which the user of the plastic welder can conveniently operate the means for advancing a melted portion of the supply rod out of the heating chamber in the heating element and onto the materials being welded. This provides an easy and convenient means for one-handed operation of the plastic welder.

The heating tip is preferably formed of a major portion of steel and a minor portion of copper, with the steel being infiltrated with the copper to produce a substantially uniform dispersion of the copper throughout the steel. The elongated forward end of the heating tip may be conveniently shaped with a planar, oblique contact surface, or an oblique contact surface having a "V"-shaped cross section for use in reaching into corners, or other suitable shape that will bring the end surface into good contact with the objects being welded.

Whatever shape is selected for the end surface of the elongated forward end of the heating the width of the surface is substantially the same throughout the major portion of its length, and the parallel, substantially straight geometric elements of which the surface is comprised all extend at substantially the same acute angle to a median plane located between the top and bottom walls of the heating tip. In addition, the one of those geometric elements that is located at the lateral center of the end surface is at least as far away from the casing as is the remainder of the end surface. Satisfactory, improved, and preferred dimensions for the heating tip and surface are described below. Finally, the length (or height) of the elongated end surface of the forward end of the heating tip is substantially the same throughout the major portion of the width of the elongated end surface.

In its preferred form, the elongated end surface or contact surface is obliquely disposed, has a "V"-shaped cross section, and is notched in the area around the supply rod heating chamber discharge aperture, with the notch extending down to the bottom end of the contact surface. This notch provides space for melted thermoplastic material from the supply rod to exit from the heating chamber discharge aperture and flow down toward the bottom end of the contact surface.

The controller of this plastic welder is designed to maintain the temperature of the heating element—when the heating element and supply rod are not in position within the heating tip and the heating tip is not in contact with the objects to be welded—at a predetermined level above the temperature of the heating tip when those components are positioned as described and the heating tip contacts the objects to be welded.

The heat controller provides an infinite number of possible temperature levels, in a continuous series from a predetermined minimum temperature level to a predetermined maximum level, for the heating tip.

The heating tip is maintained during use between a predetermined minimum temperature and a predetermined maximum temperature that are determined by the position to which the user of the device moves a selector means for the heat controller. In a preferred embodiment of the plastic welder of this invention, this position of the selector means determines the times at which an electrically actuated monitoring means intermittently interrupts the current that feeds the heating element of the welder.

Other features of the plastic welder of this invention will be disclosed below, as the invention is described by reference to the accompanying drawing.

BRIEF DESCRIPTION OF THE DRAWING

The plastic welder of this invention will be described below in reference to the accompanying drawing, in which:

FIG. 1 is a cross-sectional view of one embodiment of the plastic welder-of this invention, with the power source and heat controller shown schematically:

FIG. 2 is a top plan view of the heating tip of the plastic welder of FIG. 1;

FIG. 3 is a side elevation view of another embodiment of a heating tip for use with the plastic welder of this invention, the end surface of which has a "V"-shaped cross section formed of two oblique planar surfaces at right angles to each other;

FIG. 4 is a front elevation view of the heating tip of FIG. 3;

FIG. 4A is an enlarged, developed view of the heating tip end surface shown in FIG. 4;

FIG. 5 is a top plan view of the heating tip of FIG. 3;

FIG. 6 is a sectional view of the heating element of the embodiment of FIG. 1 and the forward portion of the extender member that protrudes from the casing to support the heating element;

FIG. 7 is a fragmentary cross-sectional view of the embodiment of FIG. 1, showing the slidable carriage advanced to the left by the user's squeezing of the trigger to the right;

FIG. 8 is an enlarged combination plan view and schematic diagram of the heat controller (with the cover removed to show the main components of the device) that is usable with the plastic welder of FIG. 1;

FIG. 9 is an illustration of a control knob for use with the heat controller of FIG. 8;

FIG. 10 is a slide elevation view of a third embodiment of a heating tip for use with the plastic welder of this invention; and FIG. 11 is a front elevation view of the heating tip of FIG. 10.

DETAILED DESCRIPTION OF THE INVENTION

FIG. 1 is a cross-sectional view of one embodiment of the plastic welder of this invention, showing both the general construction of the device and a number of important details.

1. General Construction

Plastic welder 20 includes plastic casing 22, extender member 24, heating tip 26, electrical heating element 28, advancing carriage 30 with leaf spring 36, protective sheath 38 for the supply rod of thermoplastic material with which the plastic welder is used, and handle 40 attached to the casing. These components will now be described in more detail. Casing Casing 22 is formed of a suitable plastic, with two mating members making up the casing. One such member is seen in the sectional view of FIG. 1.

Handle 40 supports casing 22. It is i the general shape of a pistol grip, and is thus readily grippable by the user of the plastic welder. Electrical power line 46 enters the interior of handle 40 through handle bottom wall 49. Power source 47 and heat controller 48 (the latter to be discussed in detail below) are shown schematically in FIG. 1.

Leads 50 and 52 extend upward into casing 22, and from there into extender member 24 for connection with heating element 28. Wire 54 provides a ground.

Hollow extender member 24 protrudes from forward end 56 of casing 22, with its rear end supported at 58, 60 and 62 with the casing. Member 24 is formed of a suitable metal, and at its extreme rear end is in contact with metal sleeve 64, with which ground wire 54 makes an electrical connection at 66.

Heating tip 28 at the forward end of extender member 24 is spaced a substantial distance from casing 22. This spacing is for convenience of handling the plastic welder, and to avoid transmission of too much heat from heating element 28 back into casing 22.

In addition to electrical leads 50 and 52, hollow extender member 24 also contains a suitable heat insulating material. Typically a refractory material such as magnesium oxide can be employed for this purpose.

2. Structure of Heating Tip

As already indicated, heating tip 26 is positioned outside and forward of casing 22, supported by the casing through extender member 24.

Heating tip 26 defines two chambers. The first of these is chamber 68 in which heating element 28 is housed, preferably snugly encased therein. The second chamber is heating chamber 70 to receive supply rod 72 of thermoplastic material after that rod is inserted in plastic welder 20 by the user of the welder.

Heating chamber 70 has feed aperture 74 at its end nearest to casing 22, and discharge aperture 76 at its other end. Feed aperture 74 of supply rod heating chamber 70, into which supply rod 72 is inserted from the right in FIG. 1., is countersunk at 78.

FIG. 2 is a top plan view of heating tip 26 of the plastic welder 20. Chamber 68 for housing heating element 28 and heating chamber 70 to receive supply rod 72 are seen in the right-hand portion and central portion, respectively, of FIG. 2. Supply rod heating chamber feed aperture 74 and discharge aperture 76 are likewise seen.

Shape Of Heating Tip End Surface

As best seen in FIG. 1, in this embodiment heating tip 26 has a planar oblique contact surface 80 at its forward end. Oblique contact or end surface 80 is inclined forward away from casing 22 at the upper end of the surface. As will be described below in the section concerning the operation of the plastic welder, this permits heating tip 26 to be conveniently brought into contact with the first and second objects of thermoplastic material that are being welded, while the melted thermoplastic material from supply rod 72 is being discharged from discharge aperture 76 of heating chamber 70 in the heating tip. Planar end surface 80 is also useful for smoothing the melted thermoplastic material from the supply rod and from the objects being welded, after the melted supply rod material has been discharged from aperture 76 of heating chamber 70.

FIGS. 3-5 illustrate an alternative embodiment of the heating tip. As will be seen from these Figures, heating tip 82 has an oblique contact or end surface 84 at its forward end that is "V"-shaped in cross section. FIG. 5 shows that each surface that forms one arm of the "V" cross section of surface 84 extends at about 45° to first median plane A—A of plastic welder 20, which is located midway between opposed side walls 81, 83 of heating tip 82. Chamber 88 for housing heating element 26 and heating chamber 90 (with feed aperture 92 and discharge aperture 94) for supply rod 72 can also be seen in these Figures.

Heating tip 82, with its forward end from top to bottom in the shape of a "V" in cross section, makes the production of many welds much simpler and quicker. Conventional preparation of the base plastic materials (i.e., the two objects to be welded) in many cases requires that the portions of the objects that are immediately adjacent the joint to be welded be beveled to provide a trough-like gap to receive the melted filler thermoplastic from the supply rod. The production of these beveled edges has typically been done in the past by filing or grinding the edges. With the unique "V"-shaped contact surface 84 at the forward end of heating tip 82, this filing or grinding procedure is eliminated, for as the tip moves across the edges of the objects to be welded it automatically forms two beveled edges filled with melted thermoplastic material from those objects, which material is immediately mixed and fused with the melted thermoplastic material from supply rod 72.

The "V"-shaped cross section of contact surfaces 84 of heating tip 82 from top to bottom of the tip is also very advantageous when it is necessary to reach a interior corner with the plastic welder of this invention.

The exterior surface of the forward end of the heating tip may, if desired, have the general cross-sectional shape shown in FIG. 1, but with a slight outward curvature in its horizontal cross-sections. The heating tip end surface may be any other suitable shape that will bring the end surface into good contact with the objects being welded.

Whatever shape is selected for the elongated forward end surface of the heating tip, four limitations will be met. These four limitations will be defined by reference to the embodiment of the heating tip shown in FIGS. 3 and 4, where first median plane A—A is located midway between two opposed side walls 81, 83 of the heating tip, and second median plane B—B is located between top wall 85 and bottom wall 87 of the heating tip.

First of all, the total width of the elongated surface—measured perpendicular to line 89 at the apex of the "V" of surface 84, first across one plane of the "V"-shaped surface and then across the other—is substantially the same throughout the major portion of the length of the surface.

Second elongated end surface 84 is made up of parallel, substantially straight, geometric elements 79 (shown schematically in FIG. 3) all of which extend at substantially the same acute angle to second median plane B—B.

Third, central geometric element 89 located at the apex of "V"-shaped end surface 84 must be at least as far away from the casing of the plastic welder as the remainder of the end surface is. In the embodiment shown in FIG. 3, central geometric element 89 is located farther from the casing than is the remainder of end surface 84, while in the embodiment shown in FIGS. 1 and 2, the central geometric element is located at the same distance from the casing as is the remainder of the end surface. Finally, the height of elongated end surface 84 is substantially the same throughout the major portion of the width of end surface 84.

FIGS. 10 and 11 show a preferred embodiment of the heating tip of the plastic welder of this invention. In this embodiment, heating tip 230 is the same as heating tip 82 illustrated in FIGS. 2-5, with the addition of notch 232 and bevel 234 located in the "V"-shaped forward end surface 236 of the heating tip. FIG. 10 is a side elevation view of heating tip 230, and FIG. 11 is a front elevation view of forward or contact end 236 of tip 230.

As will be seen, notch 232 is located in the central portion of "V"-shaped oblique contact surface 236 in the area around supply rod heating chamber discharge aperture 238, and extends to bottom end 240 of surface 236. The notch provides space for melted thermoplastic material from the supply rod to exit from heating chamber discharge aperture 238 and flow into the groove that is formed in the objects to be welded by the upper portion 242 of "V"-shaped surface 236 as it precedes the discharge aperture as heating tip 230 is moved along the joint, crack or scratch to be welded.

It will also be noted that bevel 234 on the upper, or leading, edge of "V"-shaped surface 236 will reduce the risk of that upper edge digging into the softened or melted thermoplastic material of the objects to be welded, as the edge moves along and in contact with those objects.

Dimensions Of Heating Tip End Surface

FIG. 4A is an enlarged, developed view of heating tip end surface 84 shown in FIG. 4. In this Figure, the two planar surfaces 84a and 84b (which, as will be seen, make up "V"-shaped end surface 84) have been rotated from the positions shown in FIG. 5 into a single plane, and the view given is perpendicular to that single plane.

Discharge aperture 94 has a predetermined cross-sectional area 93, and a predetermined maximum dimension 95 measured perpendicular to first median plane A—A. Portion 84a of heating tip end surface 84 has a width 97a, portion 84b has a width 97b and, taken together, dimensions 97a and 97b make up width 97 of end surface 84, all three widths being measured perpendicular to line 89 at the apex of "V"-shaped surface 84.

The relationships between the dimensions just discussed help to determine the effectiveness and efficiency of the plastic welder of this invention.

As best seen in FIG. 4, the dimensions of end surface 84 (which are actually defined in FIG. 4A) will depend upon the maximum dimension of supply rod heating chamber discharge aperture 94 measured perpendicular to median plane A—A of heating tip 82. The cross section of supply rod heating chamber 94 will preferably be chosen to be of the same cross-sectional shape as the thermoplastic supply rods that are to be used with the plastic welder. For most efficient transfer of heat from heating tip 82 to the supply rod, the supply rod heating chamber cross section should be of a size to produce a relatively close fit with the rod. In the embodiment shown, the supply rod and heating chamber are seen to be circular in cross section.

End surface 84 should be of a large enough area to provide a secure positioning of the heating element within chamber 88 of the heating tip, wit the heating element being chosen of a size to produce the most effective and efficient heating of the tip. End surface 84 will also be chosen to be large enough to cause sufficient heat to be transferred to the objects being welded to melt enough of the thermoplastic material in those objects to produce a good weld. On the other hand, the area of end surface 84 should not be so large as to produce a wasteful quantity of heat, or to melt more of the objects being welded than is necessary for a good weld. By the same token, the end surface should not be so narrow that it produces too narrow a zone of melted thermoplastic material in the objects being welded. Likewise, the end surface should not be so wide that it melts an unnecessarily wide area of the objects being welded.

Once the width and area of end surface 84 are selected, this will automatically determine the length of the end surface. However, it should be kept in mind that end surface 84 must be long enough to accommodate both heating element 88 and supply rod heating chamber 94. It should also be long enough that the use of the plastic welder can melt a sufficiently long area of the objects being welded to produce a good weld, with the user moving the plastic welder along those objects at a desired rate. At the same time, end surface 84 should of course not be so long that it tends to melt a longer area of the objects being welded than is necessary for the rate at which the user of the welder is likely to move the tool to deposit melted thermoplastic from the supply rod along the joint being welded.

Satisfactory results are obtained when (1) the area of end surface 84 (width 97 times length 99 in FIG. 4A) is about 10 times to about 25 times the predetermined cross-sectional area 93 of aperture 94, and (2) width 97 of elongated end surface 84 is about 3 times to about 6 times predetermined maximum dimension 95 of discharge aperture 94.

Improved results are obtained when these ratios are about 11 times to about 21 times, and about 3.5 times to about 5 times, respectively.

The preferred values for these ratios are about 13 times and about 4 times, respectively.

3. Electrical Heating Element

Electrical heating element 28 is designed to be housed within chamber 68 of heating tip 26, to provide a desired quantity of heat to the heating tip.

FIG. 6 gives a sectional view of a heating element that can be used to advantage with the plastic welder of this invention. Hollow metal extender member 24, which is supported at its rear end by casing 22 (as shown in FIG. 1), continues forward to form the outer sheath 96 for heating element 28. Extender member 24 and sheath 96 may be formed of any suitable corrosion resistant, relatively low heat conducting metal such as the alloy of nickel and chromium sold by Huntington Alloy Products Division of International Nickel Co., Inc. under the trademark INCOLOY.

As further seen in FIG. 6, electrical leads 50 and 52 contained in extender member 24 pass through core 98 and are connected electrically (by means not shown) to opposite ends of heating coil 100. Core 98 is formed of a refractory material such as magnesium oxide, and voids 102 within extender member 24 and voids 104 within sheath 96 are filled with powdered magnesium oxide. As a result, heat transference from heating coil 100 back through extender member 24 to casing 22 is held to a minimum; in one embodiment of the plastic welder of this invention, the heat transfer from heating tip 26 to casing 22 is only about 38° C. after five hours of continuous maximum setting for heating element 28.

As supply rod 72 is inserted in plastic welder 20 by the user of the welder, it is supported by casing feed aperture 42, by rod-receiving channel 106 of slidable carriage 30 (to be described below), and by protective sheath 38 which is engaged with casing discharge or outlet aperture 44 and with flanges 110 and 112. In this position, the forward end of supply rod 72 of the thermoplastic material is exposed and protrudes from discharge aperture 44 of casing 22 into supply rod heating chamber 70 within heating tip 26. When heating element 28 is activated, a portion of the forward end of supply rod 72 will melt upon application of sufficient heat.

Protective sheath 38, which may be formed of a suitable metal such as stainless steel, is provided in the zone where supply rod 72 extends forward of casing 22 and into heating chamber 70 as just described. Forward end 114 of protective sheath 38 is spaced a substantial distance from heating tip 26, in order to avoid conducting too much heat back to casing 22. Rear end 115 of sheath 38 is trumpet-shaped for easy entry of supply rod 72 when a new rod is inserted in the plastic welder.

4. Composition of Heating Tip

The heating tip of the plastic welder of this invention is preferably formed of a major portion of steel and a minor portion of copper. It is preferable to fabricate a tip of this composition by use of the well-known process of infiltrating the steel of the tip with copper to produce a substantially uniform dispersion of the copper throughout the steel.

In this infiltration process, a mixture of powdered steel, a lubricant such as zinc stearate, and a varying percentage of impurities is compacted in a precision die—usually at room temperature at pressures in the range of 30 to 50 tons per square inch —to produce a porous shape in the form of the final heating tip. This porous steel form is infiltrated with copper at a temperature above the melting point of copper and below the melting point of steel to produce a substantially uniform dispersion of the copper throughout the steel.

This form of heating tip has relatively low porosity (typically about five percent), and is extremely durable. If desired, a fraction of one percent by weight of cobalt may be included in the tip for additional hardness.

In its preferred form, the heating tip of the plastic welder of this invention comprises about 15 percent to about 25 percent copper and about 75 percent to about 85 percent steel, by weight. The indicated composition of steel and copper provides the heating tip with excellent heat conductivity, and at the same time excellent hardness and durability, making it possible for these tips to be given a lifetime guarantee against breakage or defects.

The infiltration process described has been known for a long time. It was used as early as the 1920's to combine a second metal with a hard, high melting point metal, such as tungsten, to produce an electrode for spot welding of metals (British patent No. 245,437) or a bearing material for uses involving heavy pressures (same patent), or to improve the wearing qualities of a cutting or turning tool (British patent No. 300,972).

The copper-infiltrated steel composition disclosed herein for heating tip 26 provides great efficiency of operation and marked economies of manufacture for a plastic welder. Despite these advantages, so far as applicant is aware this long available improvement has not been utilized by anyone in the very active field of plastic welder design prior to applicant's present invention, apparently because the improvements in the mechanical properties of infiltrated metals that have been noted in the prior art have been in such different uses. In spot welding of metals, for example, the electrode is designed to carry a substantial electrical current to produce an electric arc, while in plastic welding the heating tip is designed for high heat conductivity. Other advantages for the infiltration technique that have been stressed by the prior art—such as sealing pores in preparation for electroplating, improving machinability, making parts gas- or liquid-tight, etc. —have been unrelated to the requirements of a heating tip in a plastic welder, and thus have evidently never suggested to any worker in this field prior to applicant the use of this technique in a plastic welder.

5. Advancing Of Supply Rod

Advancing Means

In the embodiment shown, means to advance supply rod 72 unidirectionally out of casing 22 and into feed aperture 74 of supply rod heating chamber 70 within heating tip 26 is provided by slidable carriage 30. Carriage 30 includes rod-receiving channel 106 mentioned above, as well as grasping means in the form of leaf spring 32 affixed to carriage 30. Leaf spring 32 has a free end 116 positioned to press against supply rod 72 when the rod is located in rod-receiving channel 106. At least a portion of leaf spring 32 is inclined away from discharge aperture 44 of casing 22 as one moves away from free end 116 of the spring.

This arrangement of parts produces a ratchet-like effect to move the supply rod forward through casing discharge aperture 44 when carriage 30 is moved within guide channel 118 and along guide member 119 towards aperture 44. At the same time, when carriage 30 is moved away from aperture 44, free end 116 of leaf spring 32 slides across supply rod 72, and thus does not move the rod in the rearward direction within casing 22.

Advancing supply rod 72 to the left in FIG. 1 will push a previously melted portion of supply rod 72 out of discharge aperture 76 of supply rod heating chamber 70 in heating tip 26. At the same time, it will position another portion of the supply rod within chamber 70 to be melted for later discharge from the heating chamber. Several operations of the advancing mechanism described are required to move a given portion of the supply rod equal in length to the length of the heating chamber 70 completely through and out of the heating chamber. This provides adequate time for each succeeding fraction of that length of supply rod to be melted before it is expelled from the chamber.

Trigger Means

In the embodiment disclosed, manually actuatable operating means for the user of the plastic welder of this invention to selectively operate slidable carriage means 30 is provided by trigger 34. Trigger 34 has an open, ready position (seen in FIG. 1) to which it is normally biased by coil spring means 120, and a closed position in which the coil spring has been compressed by squeezing of the trigger (seen in FIG. 7).

Trigger 34 is pivotally attached to casing 22. Finger contacting surface 122 is provided on one portion of the trigger, and pivotable connection 124 is provided between trigger 34 and casing 22 at the midportion of the trigger.

A pivotable connection is also provided between trigger 34 and slidable carriage 30. In the embodiment illustrated, the pivotable connection between the trigger and the carriage is a lost motion connection at the upper end of trigger 34. This connection includes slot 126 at the upper end of trigger 34 and pin 128 carried by carriage 30, the pin being slidably positioned within the slot.

FIG. 7 discloses how trigger means 34 operates to move slidable carriage 30 towards outlet aperture 44 of casing 22 when pressed by the user's finger into its closed position shown in that Figure. As will be seen, trigger 34 is readily actuatable by the same hand with which the user of the plastic welder of this invention grips casing handle 40. This provides one of the very important novel features of the present invention. When trigger 34 is released, spring 120 returns trigger 34 to its open position, with the lost motion connection between the trigger and slidable carriage 30 returning the latter member to the original position in casing 22.

In the plastic welder of FIG. 1, second leaf spring 36 is affixed to casing 22 at the rear end of the casing as a safety feature. Second spring 36 has free end 130 positioned to press against supply rod 72 when the rod is located in rod-receiving channel 106 adjacent the spring. At least a portion of second leaf spring 36 is inclined away from discharge aperture 44 of casing 22 as one moves away from free end 130 of the spring.

This arrangement of parts produces a ratchet-like effect and keeps supply rod 72 from moving backwards past leaf spring 36 when carriage 30 is moved away from casing discharge aperture 44, so long as the first supply rod, or a follow-up supply rod, is in contact with the leaf spring. At the same time, free end 130 of spring 36 slides across supply rod 72 to permit the rod to move forward toward discharge aperture 44 when carriage 30 is moved toward that aperture.

Third leaf spring 37, located forward of carriage 30 between the carriage and casing discharge aperture 44, performs the same function as spring 36. With leaf spring 37 in place, supply rod 72 will be kept from moving backwards whenever carriage 30 is moved backwards, so long as enough unmelted rod remains of the original supply rod to extend to the rear of spring 37, or a follow-up supply rod has been inserted in casing feed aperture 42 and has been moved forward into position beneath and in contact with that spring.

The same requirement obtains, of course, for first leaf spring 32 to be operative to grasp the supply rod to move it forward toward casing discharge aperture 44—either sufficient unmelted rod must remain of the original supply rod to extend to the rear of leaf spring 32, or a follow-up supply rod must be inserted in casing feed aperture 42 and be moved forward into contact with first supply rod and into position beneath and in contact with spring 32.

6. Heat Controller

FIG. 8 is an enlarged combination plan view and schematic diagram of a heat controller (with the cover removed to show the main components of the device) that is usable with the plastic welder of FIG. 1.

ON-OFF Operation

In the embodiment shown, heat controller 48 is contained in case 132, which is formed of a suitable plastic material. Leads 134 and 136 from electrical power source 47 are connected to input terminals 138 and 140, respectively, of the heat controller. Output terminals 142 and 144 are connected through leads 50 and 52 to heating element 28 of the plastic welder. Heat controller 48 and its manually operable selector means are, as shown in FIG. 1, preferably located outside of casing 22.

Control knob 146 (shown in FIG. 9) is used to rotate cams 148 and 150, which are integrally formed of a suitable phenolic material (cam 148 being located above cam 150), and are rotatably mounted in the center of heat controller 48. The distance from the outer surface of initial portion 152 of cam 148 to center of rotation 154 decreases uniformly, as one moves in the counterclockwise direction around the circumference of the cam, to a minimum distance at its terminal portion 156. Portion 158 of the outer surface of cam 148 that lies between initial portion 152 and terminal portion 156 of the cam provides a notch that extends toward center of rotation 154.

First cam follower 160 is mounted on spring member 162, whose base 164 is secured to lower wall 165 of case 132 of the heat controller. Cam follower 160 is normally biased upward by spring member 162 against cam 148, so that its free end 167 is seated in notch 158 (as shown in FIG. 8) when control knob 146 is in the "OFF" position. The normal bias of cam follower 160 is further influenced in a manner to be discussed below, by the setting of calibration set screw 168., which bears on first bimetal member 170.

Spring-like second cam follower 172 is normally biased against the outer surface of cam 150, i.e., to the left in FIG. 8. It is fixedly connected at its base to upper wall 166 of case 132 of the controller at inlet terminal 140, and at its free end 173 carries electrical contact 174. Contact 174 is positioned to make contact with electrical contact 176, which in turn is connected to outlet terminal 144.

In the condition shown in FIG. 8, "V" shaped midportion 178 of cam follower 172 is seated in main notch 180 on the outer surface of cam 150. In this condition, control knob 146 is in the "OFF" position.

When control knob 146 is turned in the clockwise direction from index indicator 181 on case 132 of heat controller 48, smaller notch 182 on the outer surface of cam 150 moves down to the three o'clock position, and midportion 178 of cam follower 172 drops into notch 182. In this position, control knob 146 is in the "HI" position, with the "HI" mark on the control knob lined up with index indicator 181. When the control knob is rotated counterclockwise from the position shown in FIG. 9, cam 150 moves so that smaller notch 184 comes up to the three o'clock position. In this condition, portion 178 of cam follower 172 drops into notch 184, and control knob 146 is in its "LO" position, with the "LO" mark on the control knob lined up with index indicator 181.

Except for main notch 180 and smaller notches 182 and 184, the outer surface of cam 150 is substantially equidistant from center of rotation 154 of control knob 146 and cams 148 and 150. This permits positioning of cam 148 at any of an infinite number of "ON" positions between notches 182 and 184 that may be selected by the user of the plastic welder, which provides an infinite number of possible temperature levels for heating tip 26, in a continuous series from a predetermined minimum temperature level to a predetermined maximum temperature level.

The numbers that are equally spaced between the markers for the "LO" and "HI" positions on control knob 146 give the user guidance as to where to position the control knob in order to provide the correct heat level in heating tip 26 for the particular thermoplastic materials being welded.

Pilot Light

As will be seen from FIG. 8, whenever portion 178 of cam follower 172 is moved out of main notch 180, free end portion 173 of follower 172 is moved to the right to close the contact between contacts 174 and 176 near outlet terminal 144. At the same time, portion 186 of cam follower 172 makes contact with free end 188 of spring member 190, which is fixedly attached to upper wall 166 of case 132 of heat controller 48 at terminal 192.

Terminal 192 is connected by lead 194 to pilot lamp 196, and the lamp is connected on the other side through lead 198 to input lead 134. As a result, whenever control knob 146 is in position "LO" or "HI," or any "ON" position in between, pilot light 196 is on because of the completed circuit from input lead 134 to lamp 196 and from there through terminal 192 and contact 186/188 to input lead 136.

OFF Condition Of Means For Monitoring Temperature Level

The electrically actuated monitoring means that (1) automatically closes the circuit for the current that activates heating element 28, when the user of the plastic welder selects a temperature level for the heating tip by moving control knob 146 from the "OFF" position to a predetermined setting of that knob, (2) opens that circuit after a first period of time that is automatically determined by the temperature level at which the user of the plastic welder has set control knob 146, and (3) closes that circuit again after the monitoring means has been without electrical actuation for a second period of time that is also automatically determined by the temperature level at which knob 146 has been set, will now be described by reference to the left-hand portion of FIG. 8.

In order for the circuit for the current that activates heating element 28 to be closed, contact 200, which is electrically connected with input terminal 138, must be brought into contact with contact 202, which is electrically connected with output terminal 142. However, with heat controller 48 in the condition shown in FIG. 8, the circuit is not complete because contacts 174/176 and 200/202 are both open. The circumstances under which contacts 174/176 are open and closed have already been explained, and the same will now be explained for contacts 200/202.

Contact 202 is carried by phosphor bronze blade 204, which is fixedly mounted to lower wall 165 of case 132. Blade 204 normally biases contact 202 in the closed position, but when heat controller 48 is in the condition shown in FIG. 8, with free end portion 167 of cam followed 160 in notch 158, contacts 200/202 are open. The reason for this is as follows.

First bimetal member 170 and second bimetal member 206 are fixedly attached to hollow axle 208 to form an "L"-shaped subassembly that pivots around stationary bearing pin 210 at the bottom of case 132, and thus the normal upward bias of cam follower 160 is reflected in a normal bias to the left on the part of top portion 212 of second control bimetal 206. Bimetal top portion 212 extends upwards through window 214 in the horizontal leg of inverted "L"-shaped steel armature 216, which is pivoted at its bottom end around stationary bearing pin 210. Phosphor bronze blade 204 has an upwardly extending hook portion 218 at its upper end that extends through window 220 in the upper portion of the vertical leg of armature 216 to engage the rear surface of that vertical leg.

In the condition illustrated in FIG. 8, upper portion 212 of second control bimetal 206 holds the left-hand edge of window 214 of armature 216 in the position shown, which in turn holds upwardly extending hook portion 218 of blade 204 in a position in which there is no contact between contacts 200 and 202.

As indicated schematically in FIG. 8, second control bimetal 206 has heater 222 wrapped around it. The input terminals for control bimetal heater 22 are indicated at terminals 224 and 226, which are connected to output terminals 142 and 144, respectively. Since contacts 174/176 and 200/202 are open in FIG. 8, heater element 222 is cold in the condition of heat controller 48 that is shown in that Figure.

Actuation Of Monitoring Means To Close Heater Circuits Initially

When control knob 146 is moved to any "ON" position between "LO" and "HI," cam followers 160 and 172 are moved downward and to the right, respectively, in the manner explained above. The downward movement of cam follower 160 releases the upward pressure on first control bimetal 170 of the "L"-shaped subassembly of members 170 and 206, and thus relieves the leftward pressure of upwardly extending portion 212 of second control bimetal 206 on the left-hand edge of window 214 in armature 216.

This automatically permits the normal bias of blade 204, together with the pull of magnet 228 on armature 216, to move contact 202 against contact 200. With contacts 174/176 and 200/202 both closed, current flows through the parallel circuits of heating element 28 and control bimetal heater 222.

Action By Monitoring Means To Open Heater Circuits Automatically After First Period of Time As soon as current begins to flow in control bimetal heater 222 and the temperature of second control bimetal 206 therefore begins to rise, the resultant flexing to the left by bimetal 206 begins to exert a force on steel armature 216 that will ultimately overcome the pull on the armature from magnet 222, and cause the armature to snap to the left and thereby break contact 200/202 to open the circuit across heating element 28.

The positioning of second control bimetal 206, and therefore the distance it will have to flex before its upper portion 212 presses against the left edge of window 214 in armature 216 with sufficient force to break contact 200/202 in the manner described, will be determined automatically, primarily by the angular position of cam 148 with respect to free end 167 of cam follower 160, and secondarily by the condition of first bimetal 170.

First control bimetal 170 is selected to be somewhat more responsive to temperature changes than is second control bimetal 206. This first bimetal member 170 acts as an ambient temperature compensator to neutralize the effect of ambient temperature changes on second control bimetal 206, and thus its effect is determined by the ambient temperature itself and by the position of calibration set screw 168 as adjusted by the user through access opening 227 in lower wall 165 of case 132. As already mentioned, the positioning of second control bimetal 206 will depend to some extent upon the action of first control bimetal member 170, but will depend primarily upon the angular position of free end 167 of cam follower 160 upon the outer surface of tapered cam 148, which in turn is determined by whatever setting of control knob 146 was initially selected by the user of the plastic welder.

As the temperature of second control bimetal 206 continues to rise because of the effect of heater 222, that bimetal member will flex an increasing point where it exerts a force through its upper portion 212 on armature 216 that is greater than the pull on the steel armature of magnet 228. At that point, contact 200/204 will open with a snap action, as the armature is pushed away from the magnet. The breaking of contact 200/204 cuts off the current to heating element 28 and to control bimetal heater 222 as well.

The timing of the cut-off of current to heating element 28 is determined primarily, as explained above, by the angular position of cam 148 with respect to free end 167 of cam follower 160, which in turn is determined automatically by whatever setting of control knob 146 has been selected by the user of the plastic welder. The shorter the distance the control knob is rotated clockwise from its "OFF" position, the farther cam follower 160 will be pushed by cam 148 away from center of rotation 154. This will bring upper end portion 212 of second control bimetal 206 farther to the right in FIG. 8, which in turn will mean that this first period of time that the control bimetal will have to be heated, before its flex will overcome the pull of magnet 228 on armature 216 and cause contacts 200/202 to snap open, will have to be a longer period.

The longer the period of time current flows through heater 28, the higher the operating temperature of the plastic welder will be. The shorter the period, the lower the temperature will be. And, as explained just above, this period of time is determined by the user's setting of control knob 146, which will be selected on the basis of the known range of melting temperatures for the particular thermoplastic materials being welded.

Action By Monitoring Means To Restore Heater Circuits Automatically After Second Period of Time With control bimetal heater 222 inactivated, second control bimetal 206 cools and begins to flex back to the right. As this happens, it permits steel armature 216 to move to the right under the influence of the normal bias of blade 204. As second control bimetal 206 continues to cool, it flexes farther to the right, until after a second period of time steel armature 216 has moved to a point where the magnetic pull of magnet 228 overcomes the forces of tension in the bimetal control, and contacts 200/204 close with a snap action.

As will be seen, the length of this second period during which second control bimetal 206 is cooled and flexes to the right is determined automatically—just as was the case with the length of the first period, during which bimetal 206 was heated and flexed to the left—by the initial setting of control knob 146 that was selected by the user of the welder.

The closing of contacts 200/204 re-energizes heating element 28 and control bimetal heating 222, and the cycle is repeated.

The use of the heat controller described to produce intermittent operation of heating element 28 in order to maintain the temperature of heating tip 26 within a range having a predetermined minimum and a predetermined maximum provides important advantages of stability and efficiency of operation. As a result, no air assist is required to avoid overheating of the welder, and a heating element rated at only 56 watts (compared to 500–750 watts with many plastic welders presently known) can be used. The snap action described in the closing and opening of contacts 200/204 helps extend the life of those contacts.

Heat controllers of the specific type described have been on the market since the early 1960's, and heat controllers have been used to produce intermittent operation of a heating element in this general manner since at least shortly after World War II, yet so far as applicant is aware no plastic welder developed over the intervening years has utilized this expedient.

7. Typical Products With Which Plastic Welder Of This Invention Case Be Used Typical products formed of thermoplastic materials that can be repaired by use of the plastic welder of this invention include the following, among others:

(a) ABS (Acrylonitrile-Butadiene-Styrene)

Household appliances, business machines, telephones, luggage, power tools, bathtubs, showers, pipe, pipe fittings, toys, faucets, sporting goods, etc.

(b) Nylon

Automotive products (from stone shields to power steering reservoirs), electrical components, electronic components, TVs, computers, power tool housings, sports goods, toys, gun stocks, furniture, etc.

(c) Polyethylene

Automotive products, (lamp sockets, cowls, grills, window handles, door parts), electrical components, electronic components, pumps, impellers, furniture, pedestal bases, etc.

(d) Polypropylene

Packing (rigid and semi-rigid), boxes, bottles, appliances, washer agitators, dishwasher components, battery cases, luggage, toys, recreational items, etc.

(e) PCV (Polyvinyl Chloride)

Piping systems (pressure, agricultural irrigation, water distributing, chemical processing, electrical conduit), furniture, toys, recreational products, etc.

Set out below is a list of various thermoplastic materials. For each material, the temperature ranges at which the material melts and continues to be stable is shown in terms of both Fahrenheit and Celsius temperatures:

| Material | Min.-Max. °F. | Min.-Max. °C. |
|---|---|---|
| ABS | 374°–401° | 190°–205° |
| Nylon | 437°–500° | 225°–260° |
| Polyethylene | 230°–286° | 110°–141° |
| Polyproplyene | 342°–410° | 172°–210° |

| Material | Min.-Max. °F. | Min.-Max. °C. |
|---|---|---|
| PVC | 158°–196° | 70°–91° |

8. Maintenance Of Temperature Level Of Heating Element, With Welder In Inoperative Condition, Above Temperature When Welder Operative And In Use To achieve the temperature ranges indicated just above for particular thermoplastic materials, the setting on the heat controller must allow for the dissipation of heat through the masses of heating tip 26, supply rod 72, and the first and second objects to be welded.

To accomplish this, the plastic welder of this invention is constructed so that heat controller 48 maintains the temperature of heating element 28 when the welder is in its inoperative condition—that is, when (1) electrical heating element 28 is not positioned within heating tip 26, (2) the exposed end of supply rod 72 is not positioned within heating chamber 70 of heating tip 26, and (3) the plastic welder is not in contact with the first and second objects to be welded—at a level about 16 percent to about 32 percent above the temperature level of heating tip 26 when heating element 28 and supply rod 72 are positioned within the heating tip and the heating tip is in contact with the objects being welded, or in other words, when the welder is in its operative condition and in use.

Improved results are obtained when the first mentioned temperature level is from about 19 percent to about 27 percent above the second mentioned temperature level.

It is preferred that the first mentioned temperature level be maintained at about 22 percent above the second mentioned temperature level.

With one embodiment of the plastic welder of this invention, the indicated temperatures within the melting ranges of the particular thermoplastic materials with which this welder may be used are obtained with the following approximate settings of control knob 146 of heat controller 48:

| Material | Control Knob Setting |
|---|---|
| ABS | 3 |
| Nylon | 4½ |
| Polyethylene | 1½–2 |
| Polypropylene | 2½ |
| PVC | ½–1 |

These settings bring the temperature of heating tip 26 to a level at least high enough to fall within the predetermined melting range of the thermoplastic material or materials to be welded, but not above the maximum safe temperature for the material or materials in question.

9. Operation Of Plastic Welder

The plastic welder of this invention is very easy and convenient to operate.

The nature of the thermoplastic material to be welded is first determined. Ordinarily both the first and second objects to be welded (whether totally separate objects or parts of a single damaged object) will be of the same thermoplastic material. However, if the melting ranges of the first and second objects overlap sufficiently, the materials need be only similar to each other to allow use of the plastic welder of this invention.

After the nature of the thermoplastic material to be welded is determined, control knob 146 is set at the desired heat level in the manner indicated in the table just above. The settings suggested above are approximate, and the user will have to determine by experience whether the settings should be adjusted somewhat either upward or downward. Factors affecting this may be the thickness of the material being heated, the severity of the damage to be repaired, the severity of the ambient temperature surrounding the objects to be welded, and the period of time those objects have been exposed to that temperature.

When control knob 146 has been turned to the appropriate setting, the plastic welder should be allowed to warm up for 3 to 4 minutes to bring heating tip 26 to its fully heated condition. Supply rod 72 of filler thermoplastic material may be inserted in the plastic welder during this warm-up period, or thereafter.

The supply rod illustrated in FIG. 1, as is frequently the case, is somewhat shorter than the distance from casing feed aperture 42 in casing 22 to discharge aperture 76 of supply rod heating chamber 70 in heating tip 26. With a supply rod of such length, after the user inserts the rod in the plastic welder as described above, and the rod is manually pushed forward as near to heating chamber discharge aperture 76 of heating tip 26 as possible, the rod may be advanced still farther by the squeezing of trigger 34. The resulting successive positions of supply rod 72 are illustrated in FIG. 1 and FIG. 7.

When a supply rod has been partially used up by subsequent advances of slidable carriage 30, a new rod can be inserted through casing feed aperture 42 and pushed by the user to the point where leaf spring 32 in the carriage can get a purchase on the new supply rod. So long as supply rod 72 is in position adjacent leaf spring 32, squeezing trigger 34 will advance the rod forward into heating chamber 70 of heating tip 26. It this feature that makes convenient, one-handed operation of the plastic welder of this invention possible.

Shortly after supply rod 72 has been advanced to the left in FIG. 1 until its forward end reaches discharge aperture 76 of heating chamber 70, the forwardmost portion of rod 72 will be melted by heat from heating tip 26. The welder is then ready for use in producing a weld along a joint between a first object formed of thermoplastic material and a second object formed of a similar (usually the same) thermoplastic material. The objects may be separate objects or adjacent portions along a crack, tear, hole or the like in a single object.

To effect a weld along such a joint, the user places forward surface 80 of heating tip 26 in contact with the portions of the objects to be welded together that are immediately adjacent the joint, and moves the heating tip slowly upward along the exposed surfaces of the objects to be welded. As heating tip 26 is slowly moved along the surfaces as indicated, trigger 34 should be carefully squeezed to project a quantity of melted thermoplastic from heating chamber discharge aperture 76 to fill any gap or void between the two objects being welded.

Generally, the larger the gap or void between the two objects being welded, the more slowly the user of the plastic welder should move heating tip 26 along the surfaces of the objects being welded. Further, the larger the gap or void, the more frequently trigger 34 should be squeezed, in order to make a larger quantity of melted thermoplastic material available from supply rod 72.

As the supply rod is advanced by the squeezing of trigger 34, a new portion of the rod is constantly being provided to be melted in heating chamber 70 of heating tip 26. A supply of melted thermoplastic is thus continuously provided for discharge from heating chamber discharge aperture 76.

When trigger 34 is squeezed all the way into its fully closed position as shown in FIG. 7, a fixed quantity of melted thermoplastic material is expelled from discharge aperture 76 of heating chamber 70. This fixed quantity is automatically determined by the length of travel of carriage 30 from its position shown in FIG. 1 to its position shown in FIG. 7. If a smaller quantity of melted thermoplastic from supply rod or filler rod 72 is desired, trigger 34 should be squeezed only part way from its normal open position to its fully closed position.

As heating tip 26 is moved along the joint being welded, the melted thermoplastic material immediately adjacent the joint fuses together with the melted thermoplastic material from supply rod 72. After the plastic welder is removed from the objects being welded and its heating tip is no longer in contact with the objects or the filler material that has been deposited, the fused materials will solidify upon cooling, to form a strong, reliable weld.

The operations just described will produce a satisfactory weld in most situations. In others, it may be necessary for the user to smooth the weld over by sliding heating tip 26 back down across welded portion, without at that time pressing trigger 34.

When the plastic welder of this invention is used with heating tip 26 illustrated in FIG. 2 or with heating tip 82 illustrated in FIGS. 3–5, it will be helpful to hold the bottom of heating tip end surface 80 or 84, respectively, slightly away from the surface of the materials that are being welded. In this situation, the material of the objects being welded will be heated by conduction adjacent the upper portion of the heating tip end surface where it contacts those objects, and by radiation in the lower portion of the tip end surface where it is slightly spaced from those objects. The slight spacing will facilitate the exit of the melted thermoplastic material from the supply rod heating chamber discharge aperture, and will permit that material to be spread over, and fuse with, the melted thermoplastic material of the object being welded.

As already mentioned above, planar end surface 80 is also useful for smoothing the mixed melted thermoplastic material from the supply rod and from the objects being welded, after the melted supply rod material has been discharged from aperture 76 of heating chamber 70.

When the plastic welder includes heating tip 230 illustrated in FIGS. 10 and 11, contact surface 236 may be held in close contact with the objects being welded and notch 232 in the contact surface (described above in this specification) will provide space for the melted thermoplastic material from the supply rod to exit from heating chamber discharge aperture 238 and flow into the groove in those objects that is formed by upper portion 242 of surface 236 as it melts the material in those objects.

Ordinarily the materials to be welded by the use of the plastic welder of this invention should be at least ⅛" in thickness, or the heat from heating tip 26 may simply melt the materials through and prevent a weld from being formed. However, as the user obtains more skill and experience with the plastic welder, it may become possible to use this welder to repair somewhat thinner materials.

As will be seen, the novel plastic welder of this invention provides a means of repairing damaged objects of thermoplastic materials, or welding two separate objects of thermoplastic materials, in an easy, quick and convenient manner.

The above detailed description of this invention has been given for ease of understanding only. No unnecessary limitations should be understood therefrom, as modifications will be obvious to those skilled in the art.

I claim:

1. A plastic welder for use in securing a first object formed of a given thermoplastic material to a second object formed of a similar thermoplastic material by producing a weld along a joint between said two objects through melting the portions of said first and second objects that are immediately adjacent said joint and applying to said joint a quantity of a similar thermoplastic material in melted form from a supply rod of such material, said given thermoplastic material and said similar thermoplastic material having predetermined melting ranges that overlap for at least a portion of their respective melting ranges, and have maximum safe temperatures above which said materials should not be heated, which plastic welder comprises:

(a) a casing having a feed aperture and a discharge aperture;

(b) a handle supporting said casing, said handle being grippable by a user of the plastic welder;

(c) a heating tip positioned outside of, and supported by, the casing, said heating tip defining (i) a heating element chamber to house a heating element, and (ii) an elongated supply rod heating chamber to receive a supply rod of thermoplastic material, said supply rod heating chamber having a feed aperture and a discharge aperture, said heating tip having (i) a top wall, a bottom wall, and an elongated end wall in which said supply rod heating chamber discharge aperture is located, said elongated end wall facing away from the casing, (ii) two opposed side walls, (iii) a first medium plane located midway between said two side walls, and (iv) a second medium plane perpendicular to said first median plane and located midway between the top and bottom walls of the heating tip, said end wall having an exterior end surface that is elongated in a direction that is generally vertical when the plastic welder is positioned so that said first median plane is vertically oriented and said second median plane is horizontally oriented, said elongated end surface being comprised of a plurality of parallel, substantially straight geometric elements that are disposed generally vertically when the plastic welder is positioned as just described, all said generally vertically disposed, substantially straight geometric elements in said end surface extending substantially from top to bottom of said exterior end surface at substantially the same acute angle to said second median plane, the one of said geometric elements located at the lateral center of said elongated end surface being located at least as far away from the casing as the remainder of said end surface, the width of said elongated end surface being substantially the same throughout the major portion of the length of the elongated end surface, the height of said elongated end surface of the end wall being substantially the same throughout the major portion of the width of the elongated end surface;

(d) means to support a supply rod within said casing, after the rod is inserted in the casing feed aperture, with one end of the rod exposed and protruding from the casing discharge aperture and into the supply rod heating chamber within the heating tip, where a portion of the rod will melt upon application of sufficient heat, said supply rod being formed of a thermoplastic material similar to the given thermoplastic material;

(e) means for advancing the supply rod out of said casing, and into the feed aperture of said supply rod heating chamber within the heating tip, to thereby (i) push a previously melted portion of the rod out of the supply rod heating chamber discharge aperture, and (ii) at the same time, position another portion of the supply rod within the supply rod heating chamber to be melted therein;

(f) manually actuatable operating means on the casing for the user of the plastic welder to selectively operate the supply rod advancing means, said operating means being actuatable by the same hand with which the user of the plastic welder grips the casing handle;

(g) an electrical heating element housed within the heating element chamber in the heating tip to provide a quantity of heat to the heating tip;

(h) a heat controller in circuit with the heating element to maintain the temperature of the heating tip, with the heating element housed therein, at a level at least high enough to fall within said overlapping portions of the predetermined melting ranges of given thermoplastic material and similar thermoplastic material, but not above the maximum safe temperature for either of said materials, when the exposed end of the supply rod is inserted within the supply rod heating chamber in the heating tip and the heating tip is in contact with the immediately adjacent portions of the two objects to be welded together, said heat controller providing an infinite number of possible temperature levels for the heating tip, in a continuous series from a predetermined minimum temperature level to a predetermined maximum temperature level; and (i) manually operable selector means for the user of the plastic welder to set the temperature level provided by the heat controller at the appropriate level for the given thermoplastic material and said similar thermoplastic material, whereby (1) when the exposed end of the supply rod is inserted in the supply rod heating chamber within the heating tip, and the heating tip with the heating element housed therein is brought into contact with the portions of the first and second objects to be welded immediately adjacent the joint between the two objects, the supply rod exposed end portion and said immediately adjacent portions of said first and second objects are melted, and (2) when the supply rod advancing means is operated to push the melted portion of the supply rod out of the discharge aperture of the supply rod heating chamber, the melted thermoplastic material from the supply rod and the immediately adjacent melted portions of the two objects are fused together, to form a weld after they are allowed to cool upon removal of the heating tip from the aforementioned contact with the adjacent portions of the two objects.

2. The plastic welder of claim 1 in which:
(a) said supply rod heating chamber discharge aperture has a predetermined cross-sectional area and a predetermined maximum dimension measured perpendicular to said first median plane of said heating tip,
(b) the area of said elongated surface of the heating tip is about 10 times to about 25 times said predetermined cross-sectional area of discharge aperture, and
(c) the width of said end surface is about 3 times to about 6 times said predetermined maximum dimension of said discharge aperture.

3. The plastic welder of claim 2 in which:
(a) the area of said elongated end surface is about 11 times to about 21 times said predetermined cross-sectional area of the discharge aperture, and
(b) the width of said end surface is about 3.5 times to about 5 times said predetermined maximum dimension of said discharge aperture.

4. The plastic welder of claim 2 in which:
(a) the area of said elongated end surface is about 13 times said predetermined cross-sectional area of the discharge aperture, and
(b) the width of said end surface is about 4 times said predetermined maximum dimension of said discharge aperture.

5. The plastic welder of claim 1 in which said heating tip has an oblique contact surface at its forward end, said oblique surface being inclined forward away from said casing at the upper end of said surface, to permit the tip to be conveniently brought into contact with the first and second objects of thermoplastic material to be welded, while melted thermoplastic material from the supply rod is being discharged from said discharge aperture.

6. The plastic welder of claim 5 in which said oblique contact surface at the forward end of said heating tip is "V"-shaped in cross section, with each surface that forms one arm of said "V" extending at about 45° to said first median plane of the heating tip.

7. The plastic welder of claim 6 in which the central portion of said "V"-shaped oblique contact surface of said heating tip is notched in the area around said supply rod heating chamber discharge aperture, said notch extending to the bottom end of said oblique contact surface, to provide space for melted thermoplastic material from the supply rod to exit from said discharge aperture and flow down toward said bottom end of said contact surface.

8. The plastic welder of claim 6 in which the upper end of said "V"-shaped oblique contact surface is beveled.

9. The plastic welder of claim 1 in which said heating tip is formed of a major portion of steel and a minor portion of copper, the steel being infiltrated with the copper to produce a substantially uniform dispersion of the copper throughout the steel.

10. The plastic welder of claim 9 in which said heating tip comprises about 15 percent to about 25 percent copper and about 75 percent to about 85 percent steel, by weight.

11. The plastic welder of claim 1 in which:
(a) said heating tip with said electrical heating element housed therein is supported by a hollow, tubular extender member protruding from said casing, said heating tip being spaced a substantial distance from the casing, said extender member containing the electrical leads for said electrical heater and also have a heat insulating material contained therein, and
(b) a protective sheath is provided for the supply rod in the zone where the supply rod extends forward of said casing and into said heating chamber in said heating tip, the forward end of said protective sheath being spaced from said heating tip.

12. The plastic welder of claim 1 in which the elements of which the plastic welder is constructed are arranged and adapted to maintain the temperature of said electrical heating element, when (a) said heating element is not positioned within said heating tip, (b) the exposed end of the supply rod is not positioned within said heating tip, and (c) said heating tip of the plastic welder is not in contact with the first and second objects to be welded, at a level about 16 percent to about 32 percent above the temperature level of said heating tip when said heating element and the supply rod are positioned within the heating tip and the heating tip is in contact with the first and second objects.

13. The plastic welder of claim 12 in which said first mentioned temperature level is from about 19 percent to about 27 percent above said second mentioned temperature level.

14. The plastic welder of claim 12 in which said first mentioned temperature level is about 22 percent above said second mentioned temperature level.

15. A plastic welder for use in securing a first object formed of a given thermoplastic material to a second object formed of a similar thermoplastic material by producing a weld along a joint between said two objects through melting the portions of said first and second objects that are immediately adjacent said joint and applying to said joint a quantity of a similar thermoplastic material in melted form from a supply rod of such material, said given thermoplastic material and said similar thermoplastic material having predetermined melting ranges that overlap for at least a portion of their respective melting ranges, and have maximum safe temperatures above which said materials should not be heated, which plastic welder comprises:
(a) a casing having a feed aperture and a discharge aperture;
(b) a handle supporting said casing, said handle being grippable by a user of the plastic welder;
(c) a heating tip positioned a substantial distance outside of the casing, and supported by an extender member protruding from the casing, said heating tip defining (i) a heating element chamber to house a heating element, and (ii) an elongated supply rod heating chamber to receive a supply rod of thermoplastic material, said supply rod heating chamber having a feed aperture and a discharge aperture,
said heating tip having (i) an end wall in which said supply rod heating chamber discharge aperture is located, said end wall facing away from the casing, (ii) two opposed side walls, and (iii) a median plane located midway between said two side walls, said heating tip having an oblique elongated contact surface at its forward end, said oblique surface being inclined forward away from said casing at the upper end of said surface and having a "V"-shaped cross section formed by two elongated planar surfaces each of which extends at about 45° to said median plane of the heating tip and has substantially the same width throughout the major portion of its length and substantially the same height throughout the major portion of its width, the upper end portion of said elongated contact surface being beveled, and the ridge of said "V"-shaped oblique contact surface being notched in the area around the supply rod heating chamber discharge aperture, said notch extending to the bottom end of the oblique contact surface;

(d) means to support the supply rod within said casing, after the rod is inserted in the casing feed aperture, with one end of the rod exposed and protruding from the casing discharge aperture and into the supply rod heating chamber within the heating tip, said supply rod being formed of a thermoplastic material similar to the given thermoplastic material;

(e) means for advancing the supply rod out of said casing, and into the feed aperture of said supply rod heating chamber within the heating tip;

(f) manually actuatable operating means on the casing for the user of the plastic welder to selectively operate the supply rod advancing means, said operating means being actuatable by the same hand with which the user of the plastic welder grips the casing handle;

(g) an electrical heating element housed within the heating element chamber in the heating tip to provide a quantity of heat to the heating tip;

(h) a heat controller in circuit with the heating element to maintain the temperature of the heating tip, with the heating element housed therein, at a level at least high enough to fall within said overlapping portions of predetermined melting ranges of the given thermoplastic material and the similar thermoplastic material, but not above said maximum safe temperature for either of said materials, when the exposed end of the supply rod is inserted within the supply rod heating chamber in the heating tip and the heating tip is in contact with the immediately adjacent portions of the two objects to be welded together, said heat controller providing an infinite number of possible temperature levels for the heating tip, in a continuous series from a predetermined minimum temperature level to a predetermined maximum temperature level; and (i) manually operable selector means for the user of the plastic welder to set the temperature level provided by the heat controller at the appropriate level for the given thermoplastic material and the similar thermoplastic material, whereby (1) when the exposed end of the supply rod is inserted in the supply rod heating chamber within the heating tip, and the elongated contact surface of the heating tip is brought into contact with the portions of the first and second objects to be welded immediately adjacent the join between the two objects, the supply rod exposed end portion and said immediately adjacent portions of said first and second objects are melted, and (2) when the supply rod advancing means is operated to push the melted portion of the supply rod out of the discharge aperture of the supply rod heating chamber, the melted thermoplastic material from the supply rod and the immediately adjacent melted portions of the two objects are fused together, to form a weld after they are allowed to cool upon removal of the heating tip from the aforementioned contact with the adjacent portions of the two objects.

16. The plastic welder of claim 15 in which said heating tip comprises about 15 percent to about 25 percent copper and about 75 percent to about 85 percent steel, by weight.

* * * * *